Patented Feb. 7, 1933

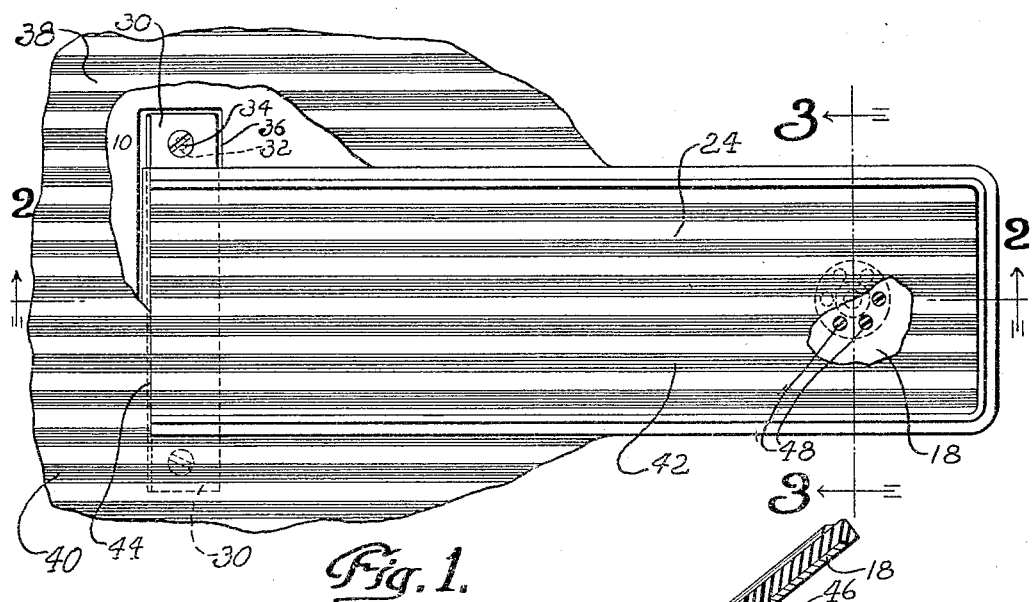
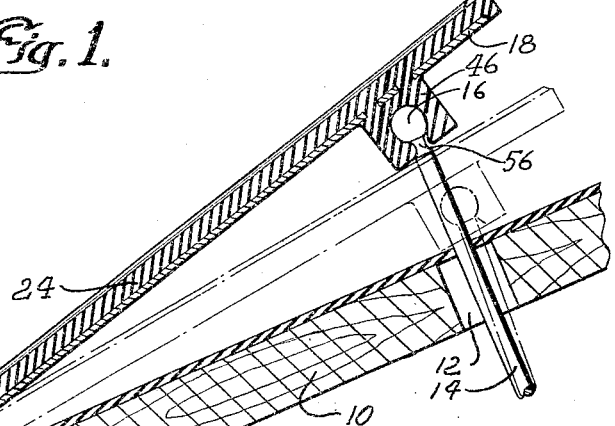
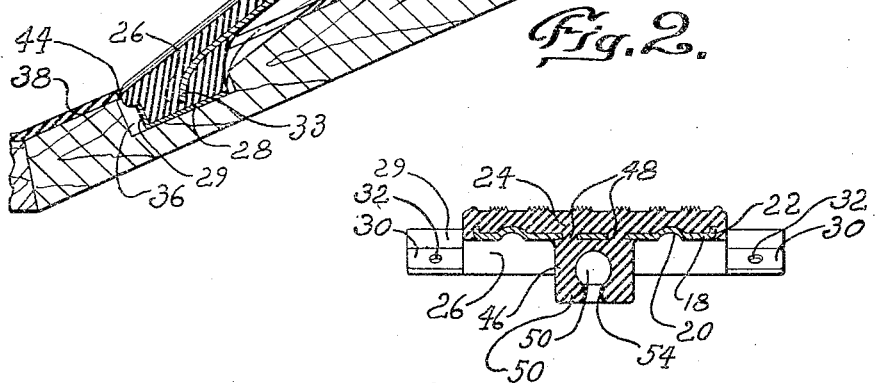

1,896,975

UNITED STATES PATENT OFFICE

RUFUS C. SANDERS AND CARROLL L. HUMPHREY, OF DETROIT, MICHIGAN, ASSIGNORS TO CHRYSLER CORPORATION, OF DETROIT, MICHIGAN, A CORPORATION OF DELAWARE

PEDAL

Application filed October 2, 1929. Serial No. 396,738.

This invention relates to a hinged member and more particularly to a hinged pedal, such as the accelerator pedal, commonly used for a throttle control in motor vehicles.

An important object of the invention is to provide a stiffening member having a coating of resilient material such as rubber, and securing a portion of the resilient material to a support, whereby the stiffening member may be moved relative to the support, the resilient material serving as a hinge connection between the stiffening member and the support.

Specifically stated, the invention consists in coating a stiffening member with a resilient material, securing a thickened portion of the resilient material to the floor board of a motor vehicle to permit the stiffening member to pivot through the resilient connection. The outer surface of the resilient coating may be formed with ribs or any suitable design to conform to the design on the floor mat of the vehicle so that the accelerator pedal appears as a continuation of the floor mat.

Other objects and advantages of the invention will more fully appear from the following description taken in connection with the accompanying drawing in which:

Fig. 1 is a plan view of my improved accelerator pedal, parts being broken away.

Fig. 2 is a sectional view on line 2—2 of Fig. 1.

Fig. 3 is a sectional view on line 3—3 of Fig. 1.

Referring to the drawing, wherein a preferred embodiment of the invention has been illustrated, the reference numeral 10 designates the floor board of a motor vehicle which is provided with an opening 12 through which extends a rod 14, commonly known as the accelerator rod. One end of the rod 14 is connected to the throttle control of a carburetor, not shown The outer end of the rod 14 is provided with a spherical end 16 adapted to be received in a projection on the improved pedal.

A metal plate 18 having longitudinal ribs 20 and side flanges 22 constitutes the body portion of the pedal. The ribs 20 are provided in the plate 18 to stiffen it and flanges 22 are provided to form a stiffening as well as a means for securing a rubber coating on the outer surface of the plate 18.

As shown in the drawing, the upper surface and the edges of the plate 18 are coated with a flexible material 24 such as rubber. If desired the upper and lower surfaces may be coated but it is preferred to have the coating only on the upper surface of the plate 18. At the lower end of the plate 18 and on the under surface thereof, the resilient material has been moulded relatively thick as at 26. A stamped angle plate 28 is moulded into the portion 26 to serve as a retaining means for the plate 18 and its coating. The plate 28 is provided with laterally extending projections 30, which are provided with openings 32 for the reception of bolts 34 which secure the pedal to the floor board. The plate 28 is preferably on the lower surface of the enlarged portion 26 and is provided with an upwardly extending flange 29 which serves as a means for stiffening the pedal to prevent angular movement thereof in a horizontal plane.

In order to position the upper surface of the pedal in a plane extending at an angle to the floor board, as is customary with accelerator pedals, the lower surface of the plate 28 forms an acute angle with the upper surface of the coating of the plate 18. It will be understood that the only connection between the plate 18 and the plate 28 is the enlarged portion 26 of the resilient coating and that the plates are spaced apart by the enlarged portion 26.

The lower end of the plate 18 has been bent downwardly to form a flange 33 and it is in spaced over-lapping relation with the plate 28 which serves as a stiffening means to prevent twisting of the pedal relative to the base or plate 28.

A recess 36 has been provided in the floor board 10 to receive the plate 28 and the enlarged portion 26 in such a manner that the upper surface of the pedal is flush with the upper surface of the floor mat 38 as shown in the drawing. Longitudinal ribs 40 have been formed on the upper surface of the floor mat 38 and the upper surface of the pedal has also been provided with longitudinal ribs 42. The floor mat 38 is cut out as at 44, to receive the lower end of the pedal. The ribs 42 of the pedal are in alignment with the ribs 40 of the mat so that there is apparently an unbroken surface between the accelerator pedal and the floor mat, thus giving the appearance of a raised portion of the mat 38 for the accelerator pedal.

At the upper end of the pedal and on its lower surface the coating on the plate 18 is formed into a downwardly extending boss 46. There are a plurality of openings 48 in the plate 18 through which the coating on the upper surface extends to form the boss 46 during the moulding process and which securely hold the boss 46 on the plate 18. The boss 46 is provided with a spherical opening 50, to receive the spherical end 16 of the rod 14. An inwardly extending flange 52, forming a relatively small opening 54 through which the spherical end 16 is inserted, engages a neck 56 between the spherical end 16 and the rod 14, to frictionally hold the spherical end 16 within the opening 50 of the boss 46.

The lower end of the pedal is securely held to the floor board by the bolts 34 and the upper end of the pedal may be depressed as shown in dotted lines in Fig. 2, the enlarged portion 26 of the resilient material serving as a hinge between the plate 18 and the plate 28. The upper surface at the lower end of the coating on the plate 28 and the upper surface of the mat 38 remain flush in any position of the pedal.

It will be understood that the various changes including the size, shape and arrangement of parts, may be made without departing from the spirit of our invention and it is not our intention to limit its scope other than by the terms of the appended claims.

We claim:

1. An accelerator pedal for automobiles comprising a rectangular flexible body portion having a thickened end portion projecting downwardly below the plane of the body portion, a reinforcing plate on the lower surface of said body portion having one end thereof embedded in the thickened end portion and bent in a plane substantially at right angles to the plane of the body portion, a resilient socket at the opposite end of said body portion for connection to an accelerator rod, a rigid member on the lower surface of the thickened end portion spaced from the embedded end of said reinforcing plate, and attaching means on said rigid member beyond the marginal edges of said body portion and below the plane of the upper surface thereof.

2. Control apparatus including an accelerator pedal of rubber and provided with thickened end portions, a metal reinforcing plate extending from one thickened end portion to the opposite thickened end portion and means for securing one thickened end portion to a support, the other thickened end portion being provided with an opening having a restricted entrance to detachably receive and resiliently hold the enlarged end of an accelerator rod, the rubber in the thickened end portion adjacent the support being positioned so as to be deformed when the pedal is depressed whereby it will tend to return the pedal and the connected accelerator rod to normal position after it has been depressed.

RUFUS C. SANDERS.
CARROLL L. HUMPHREY.